(12) United States Patent
Yang et al.

(10) Patent No.: US 7,680,036 B2
(45) Date of Patent: Mar. 16, 2010

(54) NETWORK RESOURCE PROVISIONING METHOD FOR BANDWIDTH GUARANTEE PER FLOW

(75) Inventors: Mi Jung Yang, Daejeon (KR); Tae Il Kim, Daejeon (KR); Hae Won Jung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 618 days.

(21) Appl. No.: 11/592,099

(22) Filed: Nov. 2, 2006

(65) Prior Publication Data

US 2007/0118636 A1    May 24, 2007

(30) Foreign Application Priority Data

Nov. 21, 2005    (KR)    ........................ 10-2005-0111416

(51) Int. Cl.
*H04L 12/26* (2006.01)
(52) U.S. Cl. ........................ 370/229; 370/238
(58) Field of Classification Search ........................ None
See application file for complete search history.

(56) References Cited

U.S. PATENT DOCUMENTS

| | | | |
|---|---|---|---|
| 5,592,470 A * | 1/1997 | Rudrapatna et al. | 370/320 |
| 5,987,031 A * | 11/1999 | Miller et al. | 370/412 |
| 6,324,184 B1 | 11/2001 | Hou et al. | |
| 6,487,170 B1 | 11/2002 | Chen et al. | |
| 6,661,806 B1 | 12/2003 | Eriksson et al. | |
| 6,721,573 B2 * | 4/2004 | Silvestri | 455/463 |
| 7,406,522 B2 * | 7/2008 | Riddle | 709/226 |
| 2002/0174279 A1 * | 11/2002 | Wynne et al. | 710/113 |
| 2003/0117955 A1 * | 6/2003 | Cohen et al. | 370/230 |
| 2003/0169688 A1 * | 9/2003 | Mott | 370/230 |

(Continued)

FOREIGN PATENT DOCUMENTS

EP    0814584    12/1997

(Continued)

OTHER PUBLICATIONS

"On Scale Design of Bandwidth Brokers." Zhi-Li Zhang et al. IEICE Trans. Commun., Aug. 2001. vol. E84-B, No. 8. pp. 2011-2025.

(Continued)

*Primary Examiner*—Chi H Pham
*Assistant Examiner*—Fan Ng
(74) *Attorney, Agent, or Firm*—Ladas & Parry LLP

(57) ABSTRACT

Provided is a network resource provisioning method for bandwidth guarantee per flow in a differentiated service Internet in which bandwidth needed for each flow is individually requested. The method includes setting an optimum path between a source node and a destination node based on a request for traffic for a specific period of time; performing static provisioning in which bandwidth is allocated to the optimum path according to a service class thereof; determining whether all of the bandwidth allocated to the optimum path by performing static provisioning are used up, and accepting connection admission according to the determination result; and when connection admission is not accepted, performing dynamic provisioning in which additional bandwidth is allocated to the optimum path based on a request for traffic from a new incoming flow. Accordingly, it is possible to efficiently provide a quality-guaranteed service by accepting a request for bandwidth per flow.

10 Claims, 6 Drawing Sheets

U.S. PATENT DOCUMENTS

| | | | |
|---|---|---|---|
| 2003/0235208 A1* | 12/2003 | Sahinoglu | 370/468 |
| 2004/0028054 A1* | 2/2004 | Khurana et al. | 370/395.21 |
| 2005/0083842 A1* | 4/2005 | Yang et al. | 370/230 |

FOREIGN PATENT DOCUMENTS

| KR | 19980007250 | 3/1998 |
|---|---|---|
| KR | 1020010087488 | 9/2001 |
| KR | 1020020052567 | 7/2002 |
| KR | 1020040036100 | 4/2004 |

OTHER PUBLICATIONS

"Dynamic Edge Provisioning for Core IP Networks." Raymond R.-F. Liao et al. © 2000 IEEE. pp. 148-157.

\* cited by examiner

NETWORK RESOURCE PROVISIONING METHOD FOR BANDWIDTH GUARANTEE PER FLOW

CROSS-REFERENCE TO RELATED PATENT APPLICATIONS

This application claims the priority of Korean Patent Application No. 10-2005-0111416, filed on Nov. 21, 2005, in the Korean Intellectual Property Office, the disclosure of which is incorporated herein in its entirety by reference.

BACKGROUND OF THE INVENTION

1. Field of the Invention

The present invention relates to a network resource provisioning method for bandwidth guarantee per flow, and more particularly, to a network resource provisioning method, which is a service quality guaranteeing method, for providing quality-guaranteed services by performing static provisioning based on existing requests for traffic to set an initial network and performing dynamic provisioning based on a change in incoming traffic during a data service, thereby guaranteeing bandwidth requested per flow, and a connection admission control method based on the network resource provisioning method.

2. Description of the Related Art

Advancements in data transmission technology have resulted in increases in the optical bandwidth of the Internet, e.g., XDSL and the Metro Ethernet. Also, the development of various Internet multimedia content has lead to the introduction of new application services, such as Internet broadcasting, Voice over IP (VoIP), and a virtual private network, which require guaranteed service quality. Accordingly, Internet service users have started requesting differentiated services to receive quality of service guaranteed per flow, and thus, much attention has been paid to the development of techniques of guaranteeing service quality on the Internet.

Accordingly, in the field of the Internet, there is a growing need for techniques of guaranteeing service quality that satisfy not only a bandwidth guarantee but also transmission reliability, real-time transmission, etc. in order to support service applications that need various requirements, not best-effort services.

Examples of techniques of guaranteeing service quality on the Internet include connection admission control, congestion control, traffic shaping/metering/marking, scheduling, etc. Among these techniques, connection admission control is first needed.

Connection admission control is aimed at provisioning network resources to provide a reliable path that guarantees users' requirements of a reduction in packet loss probability or network delays.

Methods of provisioning network resources using a bandwidth broker are broadly categorized into a static provisioning method and a dynamic provisioning method. Here, the bandwidth broker determines whether a user's request for a service is acceptable, and allocates resources in a network accordingly.

In general, the static provisioning method is used for network resource management using the bandwidth broker. In this method, resources are allocated to a predetermined routing path in units of a specific period of time (a day, a week, or a month) in an offline mode according to a service-level agreement, and when a user makes a request for a new connection, acceptance of the request is determined according to the allocated resources. Accordingly, the static provisioning method cannot exactly reflect the dynamic status of a network, resulting in inefficient use of resources.

In contrast, in the dynamic provisioning method, the bandwidth broker receives reports regarding the current status of a network from all nodes in the network and reflects the statuses in resource allocation. Thus, it is possible to dynamically manage resources and perform connection admission control when a user requests a new connection, according to the status of the network or a change in routing. However, this method needs frequent communication to be established between all of the nodes in the network and the bandwidth broker, and the bandwidth broker to perform resource management for each link in the network. Therefore, the dynamic provisioning method has disadvantages in terms of scalability and complexity.

Also, when using the bandwidth broker for resource allocation, since the bandwidth broker performs connection admission control for all requests for connection, responses to the requests cannot be immediately made and resource allocation depends greatly on the performance of the bandwidth broker.

Thus, the static provisioning method using a bandwidth broker is not applicable to dynamic Internet traffic or routing in a network, and a change in network resource allocation is made in units of a specific period of time in the static provisioning method, thereby preventing efficient use of network resources.

In the dynamic provisioning method, which has been introduced to compensate for the problems of the static provisioning method, the bandwidth broker receives reports regarding the status of a network from all nodes in the network and manages the network (even the levels of links in the network). Also, communication is frequently established between each node and the bandwidth broker, thereby preventing scalability and increasing complexity.

SUMMARY OF THE INVENTION

To address the problems of the conventional network resource provisioning methods, the present invention provides a method of provisioning bandwidth network resources in a differentiated service network in which bandwidth requested per flow is guaranteed by performing static provisioning according to traffic requests for a specific period of time when setting an initial network, and dynamic provisioning according to a change in incoming traffic during a service, thereby guaranteeing quality of service.

According to an aspect of the present invention, there is provided a method of provisioning network resources in a differentiated service Internet in which necessary bandwidth is requested in units of flows for bandwidth guarantee per flow, the method comprising (a) setting an optimum path between a source node and a destination node based on a request for traffic for a specific period of time; (b) performing static provisioning in which bandwidth is allocated to each service class of the optimum path; (c) determining whether connection admission is to be performed by determining whether all of the statically provisioned bandwidth allocated to the optimum path is being used; and (d) if it is determined in (c) that connection admission is not to be performed, performing dynamic provisioning in which additional bandwidth is allocated to the optimum path based on a request for traffic by a newly incoming flow.

BRIEF DESCRIPTION OF THE DRAWINGS

The above and other aspects and advantages of the present invention will become more apparent by describing in detail exemplary embodiments thereof with reference to the attached drawings in which.

DETAILED DESCRIPTION OF THE INVENTION

Hereinafter, exemplary embodiments of the present invention will be described in detail with reference to the accompanying drawings.

Figure 1:
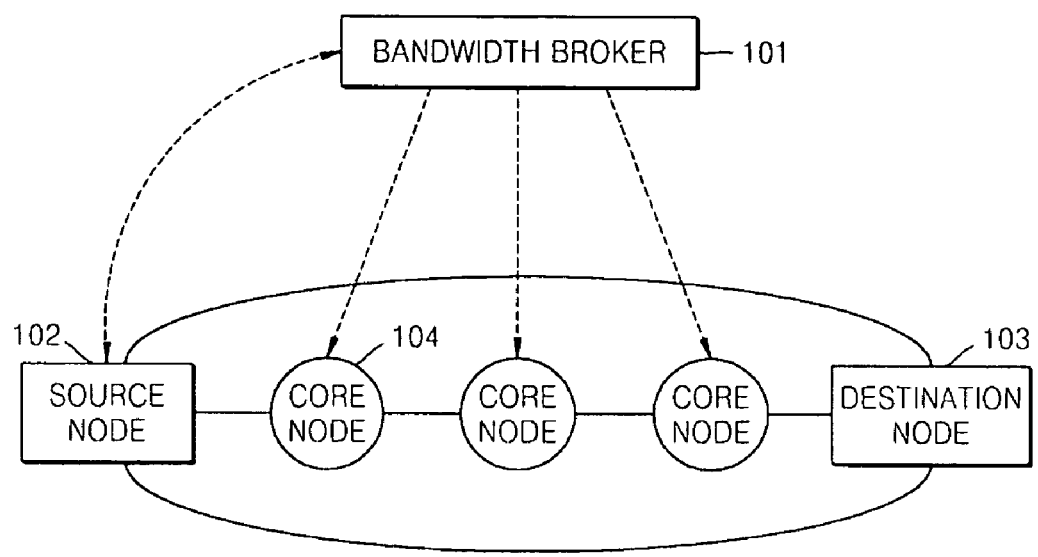
FIG. 1 is a block diagram of a differentiated service Internet according to an embodiment of the present invention.

FIG. 1 is a block diagram of a differentiated service Internet according to an embodiment of the present invention. Referring to FIG. 1, the differentiated service Internet includes a bandwidth broker 101, a source node 102, a destination node 103, and a plurality of core nodes 104. The differentiated service Internet is a network that requests necessary bandwidth per flow.

The source node 102 and the destination node 103 are respectively located at the entrance and exit of the differentiated service Internet. The core nodes 104 are located in the differentiated service Internet. The differentiated service Internet includes a plurality of the core nodes 104, but FIG. 1 illustrates three core nodes 104 for convenience.

The bandwidth broker 101 manages bandwidth resources of the source node 102, the destination node 103, and the core nodes 104.

More specifically, the bandwidth broker 101 performs initial, static provisioning on all possible paths between edge nodes in the differentiated service Internet, the paths being determined through a linear programming formulation reflecting a recent request for traffic. Then, the bandwidth broker 101 provides an allocated bandwidth to the source node 102 by performing static provisioning.

Also, when the source node 102 requests additional bandwidth, the bandwidth broker 101 performs dynamic provisioning by allocating additional bandwidth according to the amount of bandwidth resources in a related path.

The source node 102 performs connection admission control on all input traffic within the bandwidth allocated by the bandwidth broker 101.

Also, if the allocated bandwidth is used up, the source node 102 estimates additional bandwidth while considering incoming traffic, and requests the bandwidth broker 101 to allocate the estimated, additional bandwidth.

The bandwidth broker 101 reports a change in the amount of bandwidth resources, which is caused by bandwidth allocation or withdrawal through bandwidth resource provisioning, to the source node 102, the destination node 103, and the core nodes 104.

Figure 2:
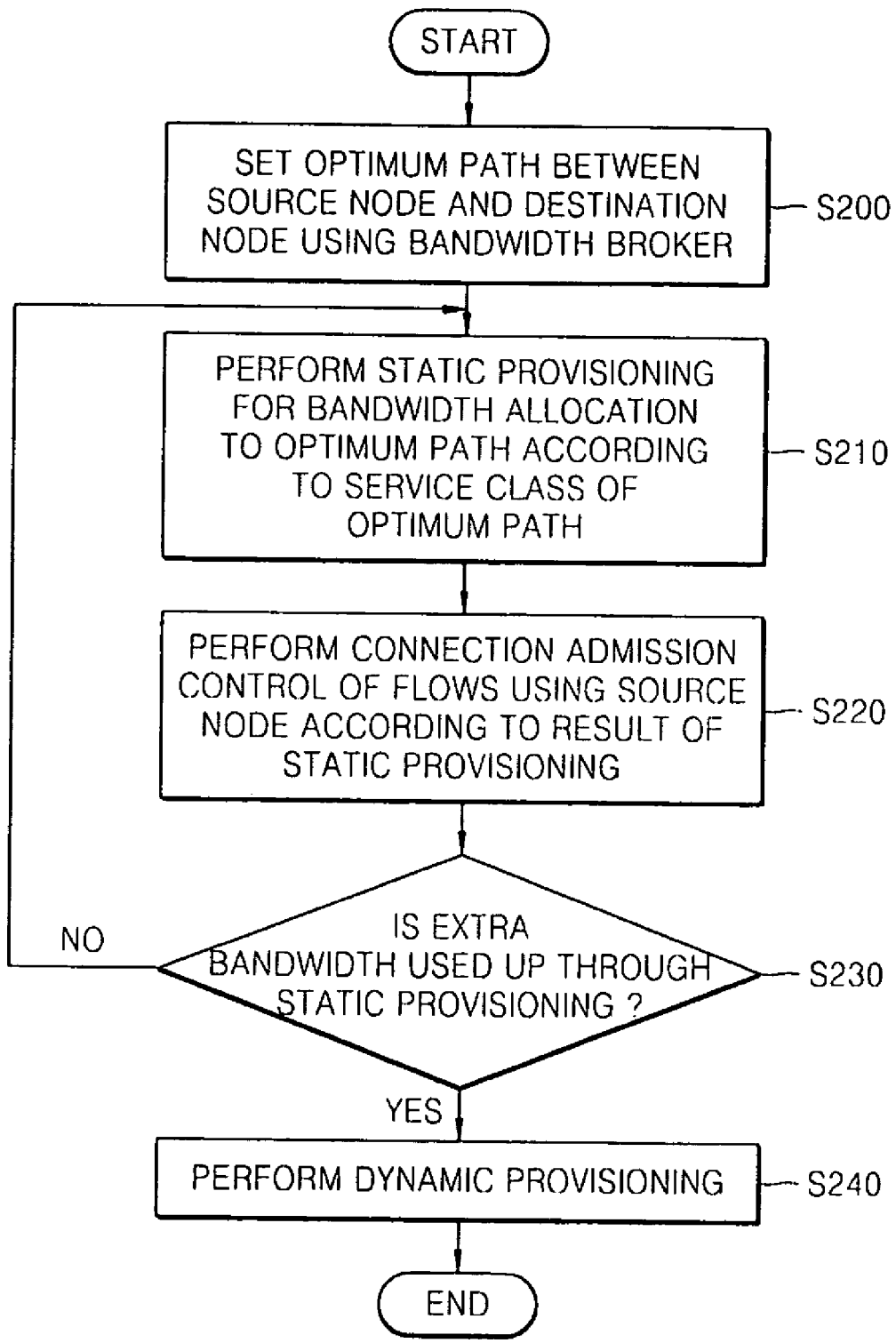
FIG. 2 is a flowchart of a bandwidth resource provisioning method in a differentiated service Internet according to an embodiment of the present invention.

FIG. 2 is a flowchart of a bandwidth resource provisioning method in a differentiated service Internet according to an embodiment of the present invention. Referring to FIGS. 1 and 2, first, the bandwidth broker 101 determines a set of optimums paths between the source node 102 and the destination node 103 based on requests for the traffic per flow for a specific period of time (S200). Operation S200 will be described in greater detail later.

Next, the bandwidth broker 101 performs initial static provisioning for bandwidth allocation for each class in each of the optimum paths determined in operation S200 (S210). In the initial static provisioning, the resources in the differentiated service Internet are provisioned based on requests for traffic per flow for a specific period of time, in which some of the overall bandwidth resources, e.g., 50% thereof, are used. Static provisioning in operation S210 will be described later in greater detail with reference to FIG. 3.

Next, the source node 102 performs connection admission control on flows according to the result of the initial static provisioning in operation S210 (S220).

Next, whether all extra bandwidth is used up due to the initial static provisioning is determined (S230). If it is determined in operation S230 that the extra bandwidth is not used up, operation S230 is performed again. If it is determined in operation S230 that the extra bandwidth is used up, operation S240 is performed.

In operation S240, dynamic provisioning is performed according to a change in the traffic of an incoming flow. Dynamic provisioning allows the dynamic use of bandwidth. Dynamic provisioning in operation S240 will be described later in greater detail with reference to FIG. 4.

Operation S200, in which optimum paths between nodes are formed based on requests for traffic per flow for a specific period of time, will now be described in detail. A set of paths between edge nodes is computed through a linear programming formulation, using the following condition:

$$\text{Minimize } L_{max} \quad (1)$$

Condition (1) must satisfy the following conditions:

$$\sum_j X_{ij}^{sd} - \sum_j X_{ji}^{sd} = \begin{pmatrix} 1, & i=s, & \forall i,s,d \\ 0, & i \neq s, & \forall i,s,d \\ -1, & i=d, & \forall i,s,d \end{pmatrix} \quad (2)$$

$$\sum_{s,d} \lambda_{sd} \cdot X_{ij}^{sd} \leq L_{max} \cdot C_{ij}, \forall_{i,j} \quad (3)$$

$$X_{ij}^{sd} \in \{0, 1\}, \quad (4)$$

where, $X_{ij}^{sd}$ denotes the ratio (%) of bandwidth allocated to the link(i,j) to bandwidth requested in the path between the source node s and the destination node d, $\lambda_{sd}$ denotes bandwidth requested in a path between a source node s and a destination node d, $L_{max}$ denotes the maximum link utilization in the overall network to be managed, and $C_{ij}$ denotes the capacity of a link(i,j)

A management network is a set of nodes connected via link having a fixed bandwidth. Requested information regarding bandwidth in a path between nodes is used in setting an optimum path based on a recent request for traffic. condition.

For example, if $X_{ij}^{sd}=0$. the path between the source node s and the destination node d does not include the link(i,j), since no bandwidth for the path is allocated to the link(i,j). Also, if $X_{ij}^{sd}=1$, the path between the source node s and the destination node d includes only the link(i,j), since 100 percent of the bandwidth requested for the path between the source node s and the destination node d is allocated to the link(i,j). If $X_{ij}^{sd}=0.4$, only 40% of traffic for the path between the source node s and the destination node d is transmitted to the link(i,j), and 60% of the traffic is transmitted to other links.

Based on the above definitions, an optimum path between the source node s and the destination node d, which satisfies a request for traffic, is determined by computing the ratio (%) $X_{ij}^{sd}$ that not only satisfies Conditions (2) through (4) but also minimizes the maximum link utilization $L_{max}$.

Condition (2) represents the property that the amount of input traffic must be equal to that of output traffic in all nodes except the source node s and the destination node d.

Condition (3) represents the fact that the total amount of bandwidth requested for all possible paths that include the same link must not be greater than the overall link capacity.

Condition (4) represents the fact that each flow cannot be divided into sub flows and a plurality of paths are not used. That is, the number of paths between edge nodes is limited to one.

With the above linear programming formulation, it is possible to compute a set of optimum paths between nodes.

Figure 3:
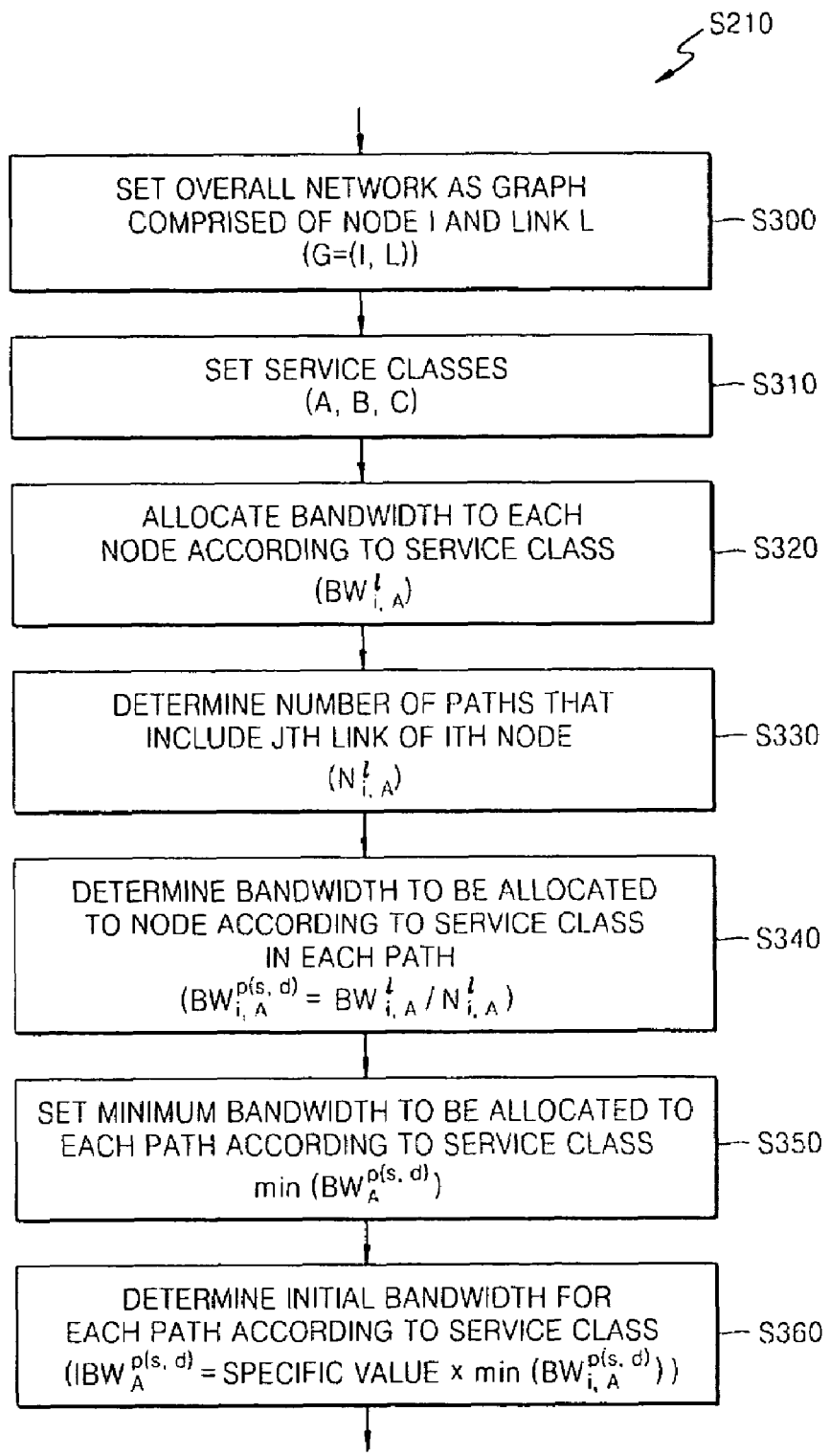
FIG. 3 is a flowchart of a static provisioning method using a linear programming formulation, included in the method illustrated in FIG. 2.

FIG. 3 is a flowchart of the static provisioning method that uses a linear programming formulation used in the method illustrated in FIG. 2. Referring to FIG. 3, first, the overall network is set as a graph G(I,L) comprised of a node i and a link j to perform initial provisioning by using the set of the paths determined in operation S200 (S300).

Next, service classes of incoming flows are determined (S310). In FIG. 3, it is assumed that the incoming flows are classified into a service class A, a service class B, and a service class C, but the number of service classes is not limited to three.

Next, a link bandwidth is allocated to each node according to the service class of the node (S320). That is, bandwidths for the service classes A, B, and C of the $j^{th}$ link of the $i^{th}$ node are $BW_{i,A}^{j}$, $BW_{i,B}^{j}$, and $BW_{i,C}^{j}$, respectively.

Next, the number of paths that include the $j^{th}$ link of the $i^{th}$ node is computed by using the paths p(s,d) determined in operation S200 (S330). That is, $N_{i,A}^{j}$, $N_{i,B}^{j}$, and $N_{i,C}^{j}$ respectively denoting the number of paths for the service class A including the $j^{th}$ link of the $j^{th}$ node, the number of paths for the service class B including the $j^{th}$ link of the $i^{th}$ node, and the number of paths for the service class C including the $j^{th}$ link of the $i^{th}$ node.

Next, bandwidth to be allocated to each node in the paths p(s,d) is determined according to the service class (S340). Here, an initial bandwidth of each node is computed according to the service class by dividing the bandwidths $BW_{i,A}^{j}$, $BW_{i,B}^{j}$ and $BW_{i,C}^{j}$, which have already been allocated according to the service class, by the numbers $N_{i,A}^{j}$, $N_{i,B}^{j}$, and $N_{i,C}^{j}$ of paths for the service classes, respectively. That is, a bandwidth $BW_{i,A}^{p(s,d)}$ to be allocated to the service class A of the $i^{th}$ node in the paths p(s,d) is equal to $BW_{i,A}^{j}/N_{i,A}^{j}$. A bandwidth $BW_{i,B}^{p(s,d)}$ to be allocated to the service class B of the $i^{th}$ node in the paths p(s,d) is equal to $BW_{i,B}^{j}/N_{i,B}^{j}$. A bandwidth $BW_{i,C}^{p(s,d)}$ to be allocated to the service class C of the $i^{th}$ node in the paths p(s,d) is equal to $BW_{i,C}^{j}/N_{i,C}^{j}$.

Next, the maximum of the bandwidths that can be allocated to each node in the paths p(s,d) is selected as an initial bandwidth per service class of each node in each path (S350). That is, the minimum bandwidth $$\min\left(\frac{BW_{i,A}^{j}}{N_{i,A}^{j}}\right)$$

of the bandwidths that can be allocated to the service class A of each node, the minimum bandwidth $$\min\left(\frac{BW_{i,B}^{j}}{N_{i,B}^{j}}\right)$$

of the bandwidths that can be allocated to the service class B of each node, and the minimum bandwidth $$\min\left(\frac{BW_{i,C}^{j}}{N_{i,C}^{j}}\right)$$

of the bandwidths that can be allocated to the service class C of each node are selected. Operation S350 is performed to allocate bandwidth to a bottleneck region in the overall paths so that the quality of service can be maintained between the source node s and the destination node d according to the service class of each path.

Next, some of the bandwidth, e.g., 50% thereof, which is computed in operation S350 is allocated as the initial bandwidth per class in each path for dynamic provisioning, in which the current status of a network when a service is provided is considered (S360). For example, if 50% of the computed bandwidth is allocated, the initial bandwidth $IBW_{A}^{p(s,d)}$ for the service class A in the paths p(s,d) is 0.5× $\min (BW_{i,A}^{p(s,d)})$, the initial bandwidth $IBW_{B}^{p(s,d)}$ for the service class B in the paths P(s,d) is 0.5×min $(BW_{i,B}^{p(s,d)})$ and the initial bandwidth $IBW_{C}^{p(s,d)}$ for the service class C in the paths p(s,d) is 0.5×min $(BW_{i,C}^{p(s,d)})$.

Figure 4A:
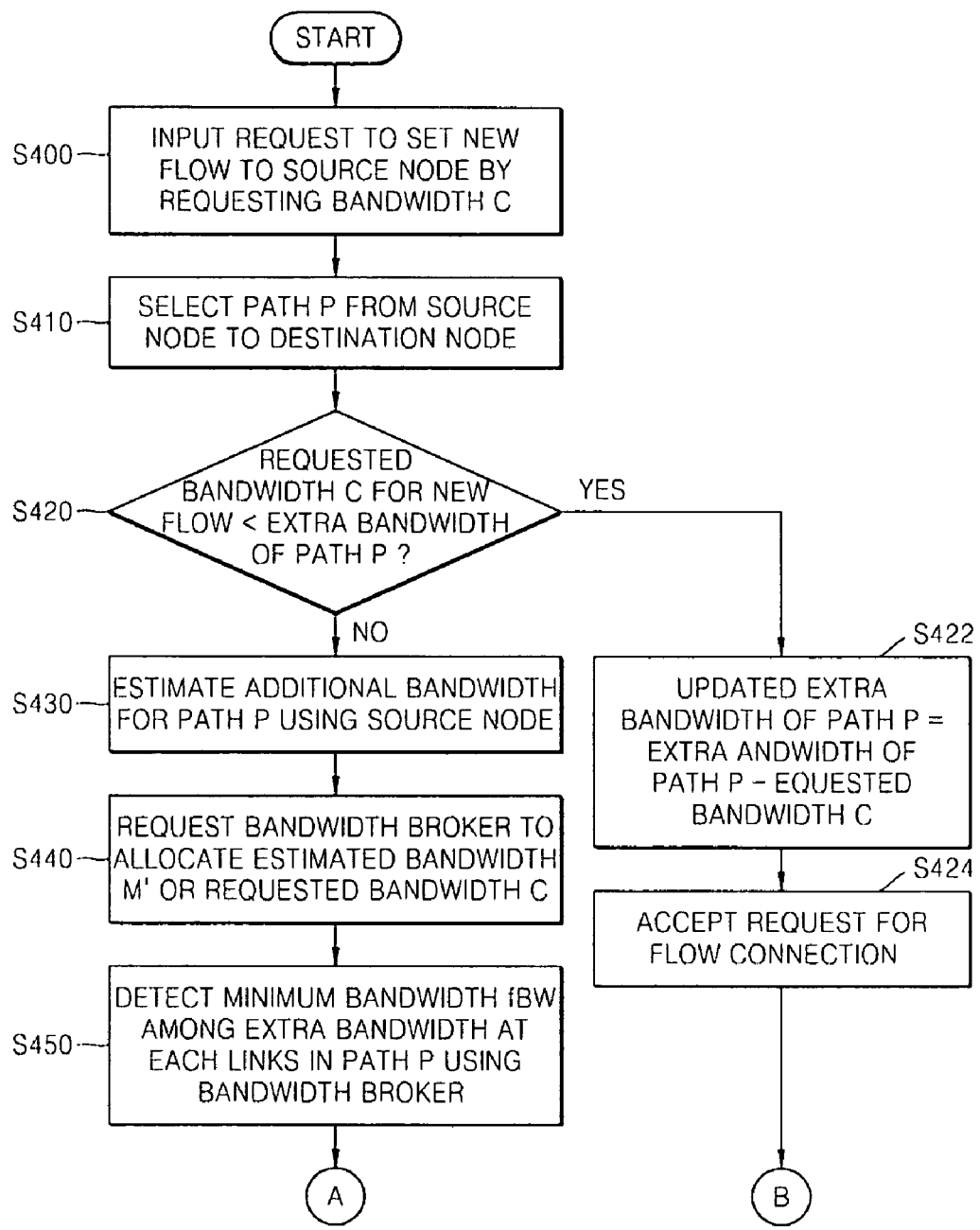
FIGS. 4A and 4B are flowcharts illustrating a dynamic provisioning method based on a change in incoming traffic per flow included in the method illustrated in FIG. 2.
Figure 4B:
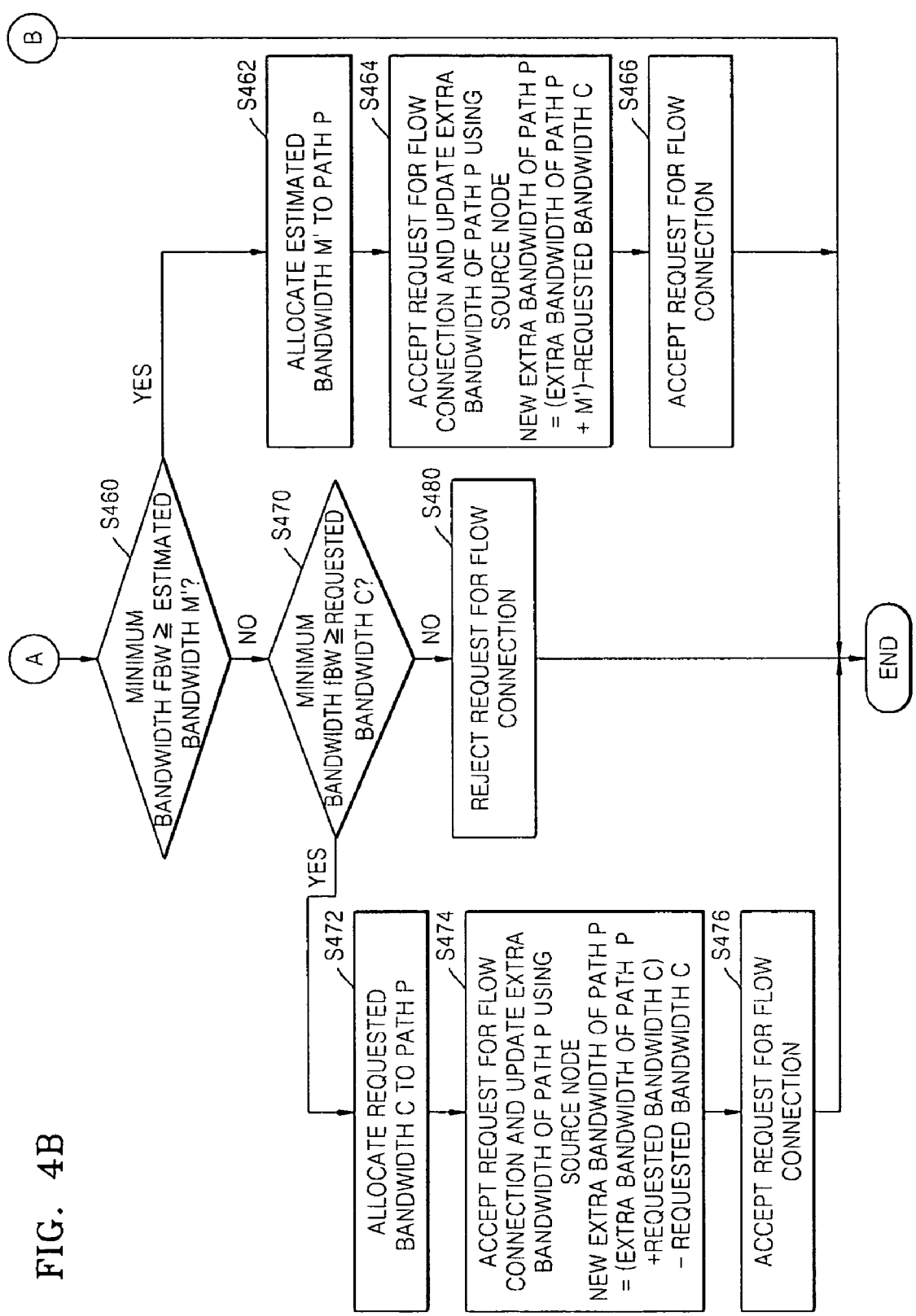

FIGS. 4A and 4B are flowcharts of the dynamic provisioning method based on a change in traffic per flow used in the method illustrated in FIG. 2. Referring to FIG. 4, first, a request for setting a new flow by requesting bandwidth c is input to a source node s (S400).

Next, a path P from the source node s to a destination node d is selected according to service class (S410).

Next, the requested bandwidth c is compared with extra available bandwidth allocated to the selected path P in order to determine whether the extra bandwidth of the path P is sufficient to receive the new flow (S420).

If it is determined in operation S420 that the extra bandwidth of the path P is sufficient to receive the new flow, the extra bandwidth of the selected path P is changed as expressed in the following condition (S422), and the request for flow is accepted (S424).

New extra bandwidth of path P=Current bandwidth of path P−Requested bandwidth c of new flow  (5)

If it is determined in operation S420 that the extra bandwidth of the path P is not sufficient to receive the new flow, the method proceeds to operation S430.

In operation S430, an estimated, additional bandwidth M' for the path P, which the bandwidth broker 101 of FIG. 1 will be requested to allocate, is computed as:

$$M' = \frac{BW_i - BW_{i-1}}{T_i - T_{i-1}} \cdot \Delta t, \qquad (6)$$

$$\text{where } \Delta t = \frac{\sum_{k=1}^{i} T_k - T_{k-1}}{i-1},$$

wherein $T_i$ denotes the time when the allocation of an $i^{th}$ additional bandwidth is requested, $BW_i$ denotes the current bandwidth in use, $BW_{i-1}$ denotes an i-$1^{th}$ additional bandwidth that was allocated and used, and $\Delta_t$ denotes an average interval of time between requests for the allocation of an additional bandwidth to the bandwidth broker 101.

When a large bandwidth is allocated to the path P, the initial bandwidth of which is insufficient to receive the new flow, it is possible to perform connection admission control while reducing communication with the bandwidth broker 101. However, since bandwidth is not allocated to another path, the probability of connection admission blocking is increased.

If a minimum bandwidth that is sufficient to receive only the new flow is allocated, frequent communication with the bandwidth broker 101 is required and increases complexity.

Accordingly, if a proper bandwidth is estimated in consideration of the status of flow received as expressed in Condition (6), it is possible to minimize the connection admission blocking probability and communication with the bandwidth broker 101.

Next, the source node s requests the bandwidth broker 101 to allocate the estimated bandwidth M' or the requested bandwidth c for the waiting new flow (S440). The source node s requests the estimated bandwidth M' or the requested bandwidth c to give connection admission to at least the waiting new flow when the estimated bandwidth M' cannot be allocated due to a bandwidth shortage.

Next, in response to the request made in operation S440, the bandwidth broker 101 detects a minimum bandwidth fBW among extra bandwidth at each of the links included in the path P (S450).

Next, it is determined whether the minimum bandwidth fBW detected in operation S450 is greater than the estimated bandwidth M' (S460). If it is determined in operation S460 that the minimum bandwidth fBW is greater than the estimated bandwidth M', the method proceeds to operation S462. In operation S462, the estimated bandwidth M' is allocated to the path P and this allocation is reported to all of the nodes in the path P, thereby performing provisioning (S462). Then, the source node s changes the extra bandwidth of the path P as indicated in Condition (7) (S464), and the request for flow connection is accepted (S466).

New extra bandwidth of path P=(extra bandwidth of
path P+estimated bandwidth M')−requested
bandwidth c  (7)

If it is determined in operation S460 that the detected minimum bandwidth fBW is not greater than the estimated bandwidth M', the method proceeds to operation S470.

In operation S470, it is determined whether the detected minimum bandwidth fBW is greater than the requested bandwidth c of the new flow. If it is determined in operation S470 that the minimum bandwidth fBW is greater than the requested bandwidth c, the method proceeds to operation S472. In operation S472, the requested bandwidth c is allocated to the path P and this allocation is reported to all of the nodes in the path P, thereby performing provisioning. Next, the source node s updates the extra bandwidth of the path P as indicated in Condition (8) (S474), and accepts the request for flow connection (S476).

New extra bandwidth of path P=(extra bandwidth of
path P+C)−requested bandwidth c of new flow C  (8)

If it is determined in operation S470 that the minimum bandwidth fBW is not greater than the requested bandwidth c, the method proceeds to operation S480. In operation S480, allocation of additional bandwidth is processed as failed and the request for flow connection is rejected.

Figure 5A:
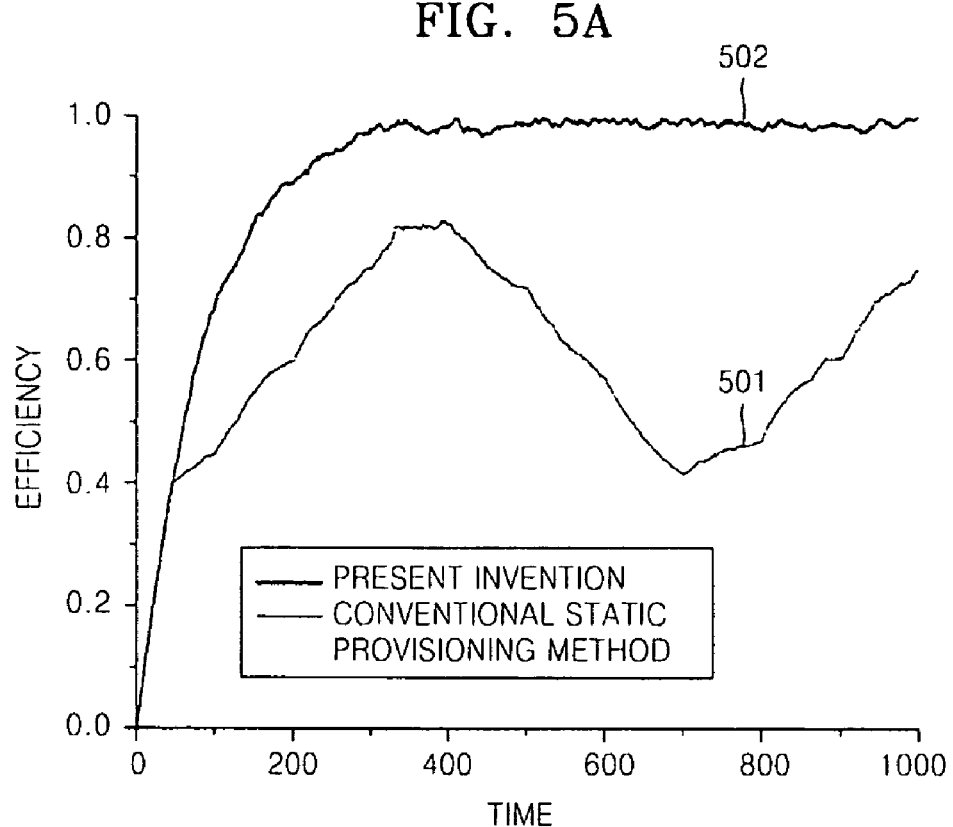
FIGS. 5A and 5B are graphs, each providing the results of a conventional bandwidth resource provisioning method and the bandwidth resource provisioning method illustrated in FIG. 2 in a differentiated service Internet.
Figure 5B:
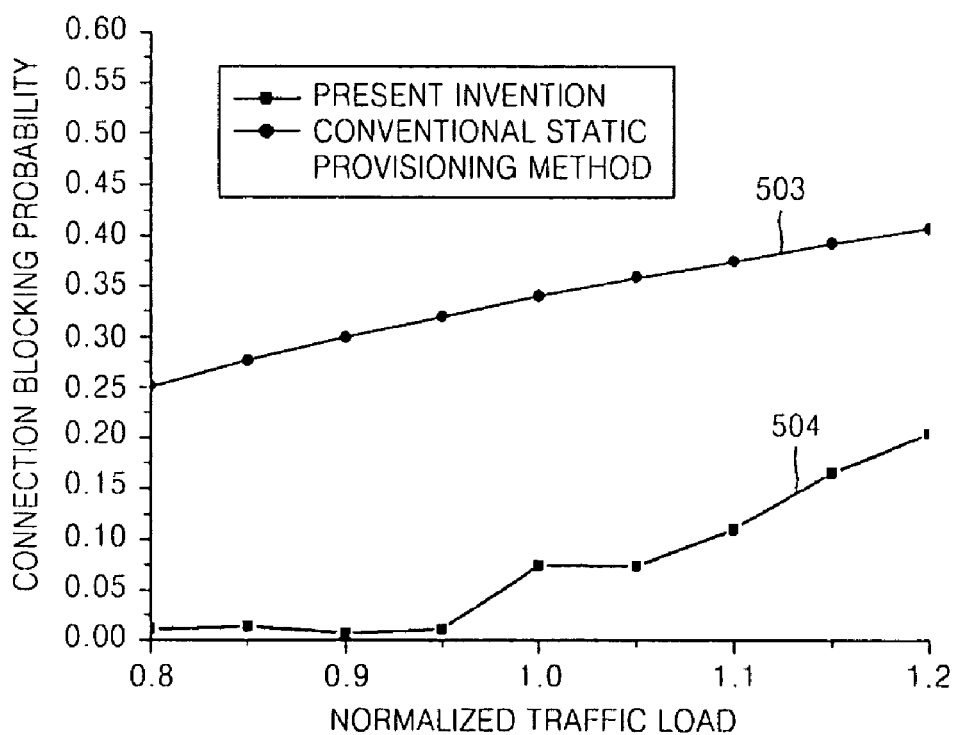

FIGS. 5A and 5B are graphs, each comparing the performance of a conventional bandwidth resource provisioning method and a bandwidth resource provisioning method according to an embodiment of the present invention performed in the differentiated service Internet illustrated in FIG. 2. Referring to FIGS. 5A and 5B, in a simulation model having six edge nodes and two core nodes, the efficiency of bandwidth resource utilization and connection blocking probability of an embodiment of the present invention were compared with those of a conventional static provisioning method.

Referring to FIG. 5A, regarding the efficiency of bandwidth resource utilization, a provisioning method 502 according to an embodiment of the present invention uses bandwidth resources more stably and efficiently than a conventional static provisioning method 501.

Referring to FIG. 5B, a connection blocking probability in a provisioning method 504 according to an embodiment of the present invention is lower than a connection blocking probability in a conventional static provisioning method 503. That is, compared to the conventional static provisioning method 503, the provisioning method 504 according to an embodiment of the present invention can receive more flows per given bandwidth resource thus providing improved performance.

The present invention can be embodied as computer readable code in a computer readable medium. Here, the computer readable medium may be any recording apparatus capable of storing data that is read by a computer system, e.g., a read-only memory (ROM), a random access memory (RAM), a compact disc (CD)-ROM, a magnetic tape, a floppy disk, an optical data storage device, and so on. Also, the computer readable medium may be a carrier wave that transmits data via the Internet, for example. The computer readable medium can be distributed among computer systems that are interconnected through a network, and the present invention may be stored and implemented as a computer readable code in the distributed system.

As described above, according to the present invention, an initial static provisioning method is used to set a path between edge nodes and allocate bandwidth according to the service class of the path, thereby allocating optimal bandwidth while reflecting a recent request for traffic. Also, it is possible to minimize communication between a bandwidth broker and each node by performing connection admission control for each flow of a source node within a statically provisioned bandwidth, thereby reducing complexity. When bandwidth allocated to each path is used up, bandwidth resources are dynamically provisioned in consideration of the status of incoming traffic, thereby enabling efficient use of network bandwidth resources.

According to the present invention, easy bandwidth management is possible since a bandwidth broker performs resource provisioning based only on information regarding bandwidth for each path. A source node can minimize the communication between each node and the bandwidth broker by performing connection admission control within a bandwidth allocated to each path through initial static provisioning without establishing communication with the bandwidth broker. If initially allocated bandwidth is used up, necessary additional bandwidth is estimated while reflecting the remaining amount of bandwidth for incoming flows for each path, and dynamic provisioning is performed based on the estimated bandwidth, thereby performing bandwidth management adaptively to the status of flow.

Also, it is possible to efficiently provide high-value added services, such as quality guaranteed service and real-time service, in a differentiated service Internet by maximizing the efficiency of resource utilization and scalability and reducing complexity.

While this invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A non-transitory computer readable media storing computer readable codes for provisioning network resources in a differentiated service Internet in which necessary bandwidth is requested in units of flows for bandwidth guarantee per flow, comprising:
   (a) setting an optimum path between a source node and a destination node based on a request for traffic for a specific period of time;
   (b) performing static provisioning in which bandwidth is allocated to each service class of the optimum path;
   (c) determining whether connection admission is to be performed by determining whether all of the statically provisioned bandwidth allocated to the optimum path is being used; and
   (d) if it is determined in (c) that connection admission is not to be performed, performing dynamic provisioning in which additional bandwidth is allocated to the optimum path based on a request for traffic by a newly incoming flow, wherein the setting the optimum path comprises computing a value which satisfies:

the amount of traffic input to and output from each of nodes, except the source node and the destination node, is the same;
   the total bandwidth requested by all paths that include the same link is not greater than an overall link capacity;
   a case where one of the flows is divided into sub flows and a plurality of paths are used is excluded; and
   overall link utilization in the differentiated service Internet is maximized.

2. The computer readable media of claim 1, wherein the setting the optimum path comprises computing a value which satisfies:

$$\text{Minimize } L_{max} \quad (1)$$

Condition (1) must satisfy the following conditions:

$$\sum_j X_{ij}^{sd} - \sum_j X_{ji}^{sd} = \begin{pmatrix} 1, & i=s, & \forall_{i,s,d} \\ 0, & i \neq s, & \forall_{i,s,d} \\ -1, & i=d, & \forall_{i,s,d} \end{pmatrix}$$

$$\sum_{s,d} \lambda_{sd} \cdot X_{ij}^{sd} \leq L_{max} \cdot C_{ij}, \forall_{i,j} \text{ and}$$

$$X_{ij}^{sd} \in \{0, 1\}$$

wherein i denotes a node, j denotes a link, s denotes a source node, d denotes a destination node, $\lambda_{sd}$ denotes bandwidth requested between the source node s and the destination node d, $L_{max}$ denotes the rate of maximum overall link utilization in the differentiated service Internet, $C_{ij}$ denotes the capacity of a link(i,j) and $X_{ij}^{sd}$ denotes a ratio (%) of bandwidth allocated to the link(i,j) to bandwidth requested between the source node s and the destination node d.

3. A non-transitory computer readable media storing computer readable codes for provisioning network resources in a differentiated service Internet in which necessary bandwidth is requested in units of flows for bandwidth guarantee per flow, comprising:
   (a) setting an optimum path between a source node and a destination node based on a request for traffic for a specific period of time;
   (b) performing static provisioning in which bandwidth is allocated to each service class of the optimum path;
   (c) determining whether connection admission is to be performed by determining whether all of the statically provisioned bandwidth allocated to the optimum path is being used; and
   (d) if it is determined in (c) that connection admission is not to be performed, performing dynamic provisioning in which additional bandwidth is allocated to the optimum path based on a request for traffic by a newly incoming flow, wherein (b) comprises:
   (b1) computing bandwidth to be allocated to respective nodes in the optimum path according to a service class of the optimum path;
   (b2) selecting a minimum bandwidth from among the bandwidths; and
   (b3) allocating a predetermined percentage of the minimum bandwidth as an initial bandwidth to the service classes of the optimum path.

4. The computer readable media of claim 3, wherein the predetermined percentage is 50% of the minimum bandwidth.

5. A non-transitory computer readable media storing computer readable codes for provisioning network resources in a differentiated service Internet in which necessary bandwidth is requested in units of flows for bandwidth guarantee per flow, comprising:
   (a) setting an optimum path between a source node and a destination node based on a request for traffic for a specific period of time;
   (b) performing static provisioning in which bandwidth is allocated to each service class of the optimum path;
   (c) determining whether connection admission is to be performed by determining whether all of the statically provisioned bandwidth allocated to the optimum path is being used; and
   (d) if it is determined in (c) that connection admission is not to be performed, performing dynamic provisioning in which additional bandwidth is allocated to the optimum path based on a request for traffic by a newly incoming flow, wherein (c) comprises:
   (c1) receiving a new flow which requests a bandwidth c through the source node;
   (c2) selecting a path using the destination node and the service classes;
   (c3) comparing extra bandwidth available to the selected path with the requested bandwidth c, and determining whether the extra bandwidth is sufficient to accept connection of the new flow; and (c4) if it is determined in (c3) that the connection of the new flow is acceptable, updating the extra bandwidth of the selected path to be equal to the extra bandwidth—the requested bandwidth c, and accepting the connection of the new flow.

6. The method computer readable media of claim 5, wherein (d) comprises:

(d1) if it is determined in (c3) that the connection of the new flow is not acceptable, estimating a new bandwidth M' to be requested for the selected path, and requesting a bandwidth broker to allocate the estimated bandwidth M' to the selected path;

(d2) detecting a minimum bandwidth among extra bandwidth at all links included in the selected path, and comparing the detected minimum bandwidth with the estimated bandwidth M' determine whether the detected minimum bandwidth is greater than the estimated bandwidth M';

(d3) when it is determined that the minimum bandwidth detected in (d2) is greater than the estimated bandwidth M' allocating the estimated bandwidth M' to the selected path using the bandwidth broker; and (d4) computing the sum of the existing extra bandwidth and the estimated bandwidth M', and updating the extra bandwidth for the selected path as the sum minus the requested bandwidth c using the source node.

7. The computer readable media of claim 6, further comprising:

(d3') when the minimum bandwidth detected in (d2) is less than the estimated bandwidth M' greater than the requested bandwidth c, allocating the requested bandwidth c to the selected path using the bandwidth broker; and (d4') computing the sum of the existing extra bandwidth and the requested bandwidth c, and updating the extra bandwidth of the selected path as the sum minus the requested bandwidth c.

8. The computer readable media of claim 6, further comprising (d3"), when it is determined that the minimum bandwidth detected in (d2) is less than the requested bandwidth c, rejecting a request for the connection of the new flow using the bandwidth broker.

9. The computer readable media of claim 6, wherein the estimated bandwidth M' is greater than the requested bandwidth c.

10. The method computer readable media of claim 6, wherein the estimated bandwidth M' is determined such that a connection blocking probability and communication to be established with the bandwidth broker are minimized.

* * * * *